United States Patent
Guth

(10) Patent No.: US 6,450,515 B1
(45) Date of Patent: Sep. 17, 2002

(54) CLIP-ON WHEELS FOR PALLETS OR OTHER STRUCTURES WITH RUNNERS

(76) Inventor: James F. Guth, 610 S. Carolina Ct., St. Charles, MO (US) 63303

( * ) Notice: Subject to any disclaimer, the term of this patent is extended or adjusted under 35 U.S.C. 154(b) by 0 days.

(21) Appl. No.: 09/685,170

(22) Filed: Oct. 10, 2000

(51) Int. Cl.[7] ................................................. B62B 1/04
(52) U.S. Cl. ................................ 280/79.11; 280/47.32; 16/30
(58) Field of Search ........................... 280/79.11, 79.2, 280/79.5, 47.2, 47.34, 47.35, 47.32, 47.3; 16/29, 30; 108/51.1

(56) References Cited

U.S. PATENT DOCUMENTS

| | | | | |
|---|---|---|---|---|
| 1,278,476 A | * | 9/1918 | Johnson | 16/29 |
| 1,532,064 A | * | 3/1925 | Neiswender | 16/29 |
| 2,049,344 A | | 7/1936 | Wittke, Jr. | 16/30 |
| 2,175,317 A | * | 10/1939 | Rogers | 16/30 |
| 3,717,657 A | * | 2/1973 | Schaefer | 280/79.11 |
| 4,576,391 A | | 3/1986 | Gerstner | 280/79.11 |
| 4,772,035 A | * | 9/1988 | Danial | 16/30 |
| 5,452,365 A | * | 9/1995 | Kalis | 381/389 |
| D363,209 S | | 10/1995 | Murphy | D8/375 |
| 5,503,417 A | | 4/1996 | Murphy | 280/79.11 |
| 5,934,634 A | | 8/1999 | Lindblom | 248/230.1 |
| 6,095,537 A | * | 8/2000 | Cozza et al. | 280/79.11 |

FOREIGN PATENT DOCUMENTS

| | | | | |
|---|---|---|---|---|
| CA | 634538 | * | 1/1962 | 280/79.11 |
| DE | 20 15 238 B2 | * | 1/1979 | 280/79.11 |
| FR | 2 630 410 A | * | 10/1989 | 280/79.11 |

\* cited by examiner

*Primary Examiner*—Frank Vanaman
(74) *Attorney, Agent, or Firm*—Grace J. Fishel

(57) ABSTRACT

Pallets and other structures with runners used in storing and transporting material may be fitted with wheels. The wheels permit the pallets and other structures, and the material placed thereon, to be moved by hand. The wheels may also facilitate movement of some pallets or the like with mechanical assistance. The wheels may be removably attached to both double deck and single deck pallets or other structures with runners and are retained thereon by a snug resilient fit. Installation may be accomplished by hand or with simple tools, such as by a hammer. Installation forces resilient walls of the wheel assembly over a deckboard or stringer board of the structure. The resilient walls may include retaining structure, such as barbs, to assist in holding the wheel assemble on the structure.

12 Claims, 5 Drawing Sheets

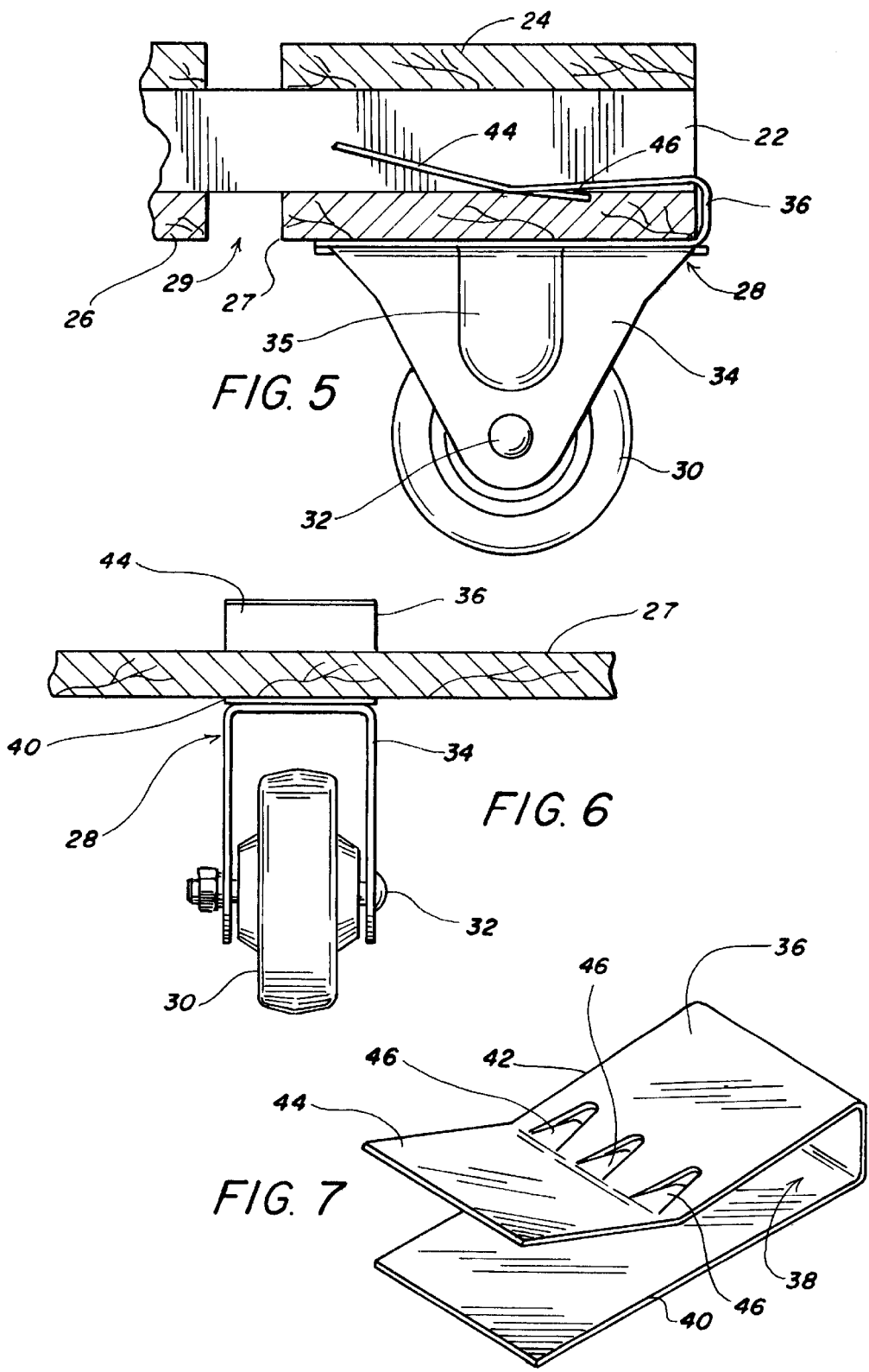

CLIP-ON WHEELS FOR PALLETS OR OTHER STRUCTURES WITH RUNNERS

BACKGROUND OF THE INVENTION

1. Field of the Invention

The present invention relates to the field of material handling equipment. More particularly, this invention relates to equipment used in storing and transporting palletized materials or used with other structures having runners such as refrigeration cases.

2. Brief Description of the Prior Art

Many materials are stored and transported on pallets. The materials may be placed on pallets at the place of manufacture and stored in a warehouse for later shipping to purchasers. Movement of the palletized materials typically requires use of a motorized forklift truck or a hand dolly. These machines are expensive and take up space. In many instances, particularly with small lots of material, it would be more convenient and more economical, if palletized material could be moved by hand without the use of a dolly.

The following U.S. Patents are incorporated by reference herein: D U.S. Pat. Nos. 363,209, 2,049,344, 4,576,391, 5,503,417 and 5,934,634.

BRIEF SUMMARY OF THE INVENTION

In view of the above, it is an object of the present invention to provide wheel assemblies which may be attached to conventional pallets or to other structures with runners. It is another object to provide wheel assembles which may be removably attached to the component boards of conventional pallets. It is also an object to provide wheel assemblies for pallets that permit the pallets to be moved by hand without the use of forklift trucks or dollies. It is a further object to provide removable wheel assemblies for both single deck and double deck pallets.

The present invention permits palletized material, and the pallets on which material may be stored, to be moved by hand without the use of a dolly. The invention provides wheel assemblies which may be attached to conventional pallets. The wheel assemblies may be attached and removed easily by hand or with a minimum of tools, often with only a hammer. Embodiments of the invention are available for use with both double deck and single deck pallets. It will be appreciated also that the wheel assemblies of the present invention may be used on other structures with runners.

The wheel assemblies of one embodiment of the invention clip to the deck boards of a pallet. A further embodiment of the wheel assemblies clips to the stringer boards of a pallet, refrigeration case or other such structure. The wheel assemblies may use fixed wheels or may use wheels that swivel. The wheel assemblies are typically made of strong and durable material. The wheel components may be made of conventional material, such as rubber, steel and plastic with conventional bearings and steel axles, for example, with sealed bearings. The clip portions of the wheel assemblies are preferably made of steel, such as spring steel, or an equivalent resilient material.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 5 is a side view, in partial cross-section, of the double deck pallet and wheel assembly shown in FIG. 1;

FIG. 6 is a partial cross-sectional view of the double deck pallet and wheel assembly shown in FIG. 1;

FIG. 7 is a perspective view of the clip portion of the wheel assembly shown in FIG. 1;

DETAILED DESCRIPTION OF THE INVENTION

Figure 1:
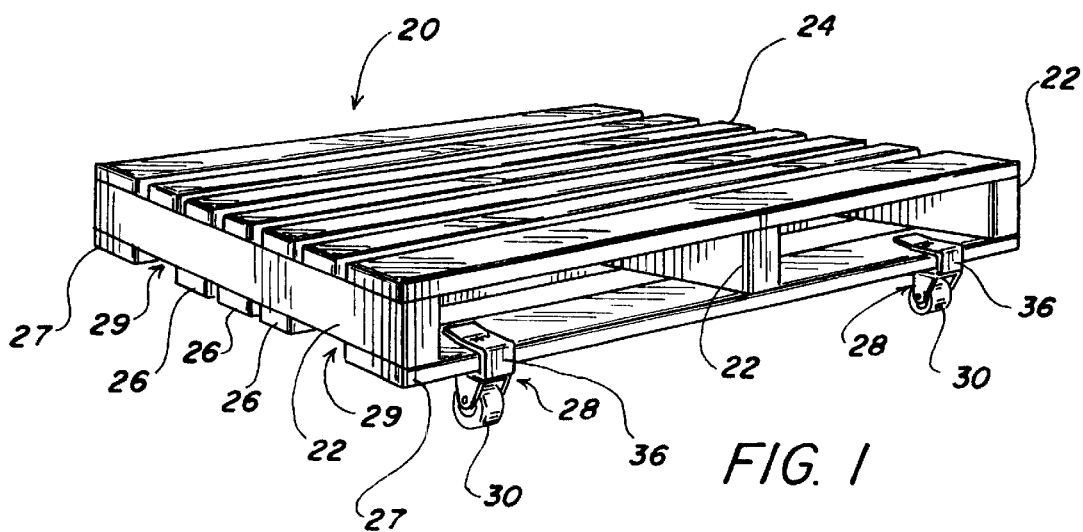
FIG. 1 is a perspective view of a double deck pallet with wheel assemblies in accordance with the present invention.

Referring to FIG. 1, a conventional double deck pallet 20 is shown. Pallet 20 has three stringer boards or runners 22 and top slats or deckboards 24. Pallet 20 also has bottom slats or deckboards 26 and 27. Bottom deckboards 27 are placed at each end of pallet 20, while bottom deckboards 26 are placed between bottom deckboards 27 with wider gaps 29 between adjacent bottom deckboards 26 and 27.

As shown in FIGS. 1, 5 and 6, wheel assemblies 28 of the invention are installed on pallet 20 on end bottom deckboards 27 at each end of pallet 20. However, wheel assemblies 28 may also be installed on bottom deckboards 26 or on the inner side of bottom deckboards 27 through gaps 29, if desired. As illustrated in the drawings, wheel assemblies 28 use a conventional wheel 30 with a conventional axle 32 mounted in a bight or U-shaped mount 34. As shown in FIG. 5, U-shaped mount 34 may include a stamped strengthening bulge 35, as is known in the art. While mount 34 is shown as U-shaped, it will be appreciated that it may be of other shapes, for example as a single depending plate, not shown, on which a suitable axle and wheel combination is mounted.

Wheel assemblies 28 also include an attaching bracket 36, shown in more detail in FIG. 7. Attaching bracket 36 and mount 34 may be formed as an integral piece, as is known in the art. Attaching bracket 36 and mount may also be made as separate pieces and joined by conventional means, such as by welding or the use of suitable fasteners, as is known in the art. As shown in FIG. 7, attaching bracket 36 encompasses a space 38 which receives a deckboard, such as deckboard 27 shown in FIG. 5. Space 38 is bounded by a bottom plate 40 and a top plate 42. Top plate 42 is resiliently biased toward bottom plate 40 to tightly confine deckboard 27 when deckboard 27 is received in attaching bracket 36.

Top plate 42 may have a guide lip 44, as shown in FIG. 7. Guide lip 44 is bent upwardly and outwardly from top plate 42 to guide a deckboard 26 or 27 into space 38 where it is tightly confined between top plate 42 and bottom plate 40. As shown in FIGS. 5 and 7, top plate 42 may also have retaining barbs 46 which are stamped into top plate 42. If desired, bottom plate 40 could also have retaining barbs, not shown. Retaining barbs 46 are biased toward bottom plate 40 an additional distance and may be pointed to dig into the surface of a deckboard 26 or 27, as shown in FIG. 5. Retaining barbs 46 assist in providing a firm attachment between wheel assembly 28 and a pallet 20.

Figure 2:
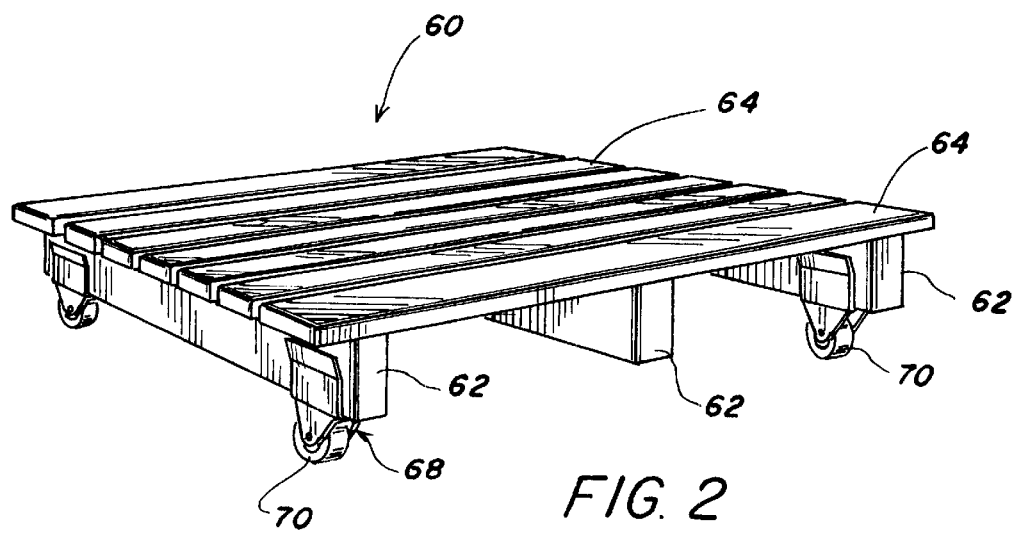
FIG. 2 is a perspective view of a single deck pallet with wheel assemblies of the invention.
Figure 8:
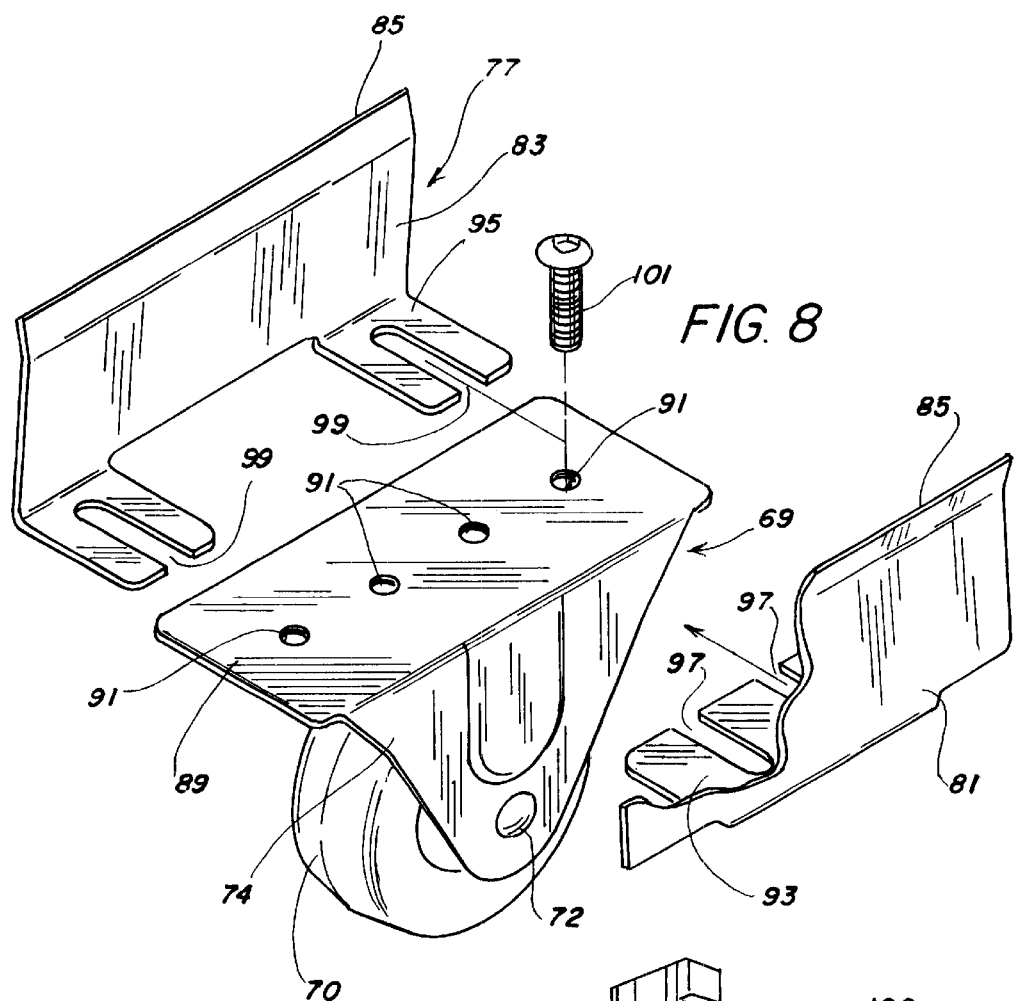
FIG. 8 is an exploded view of a further embodiment of a wheel assembly.
Figure 9:
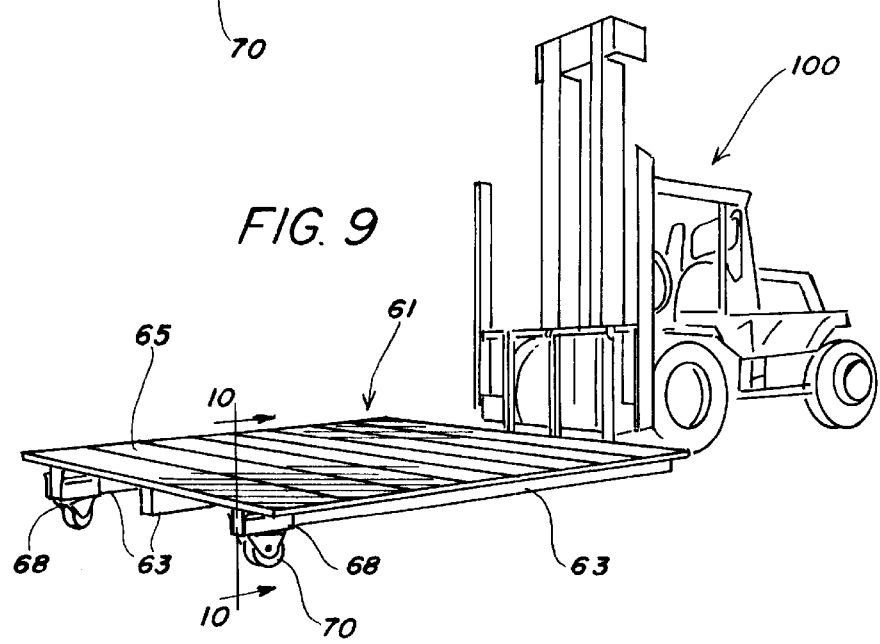
FIG. 9 is a perspective view of a single deck long pallet with wheel assemblies of the invention; and, FIG. 10 is a partial cross-sectional view of the single deck long pallet and wheel assembly shown in FIG. 9.
Figure 10:
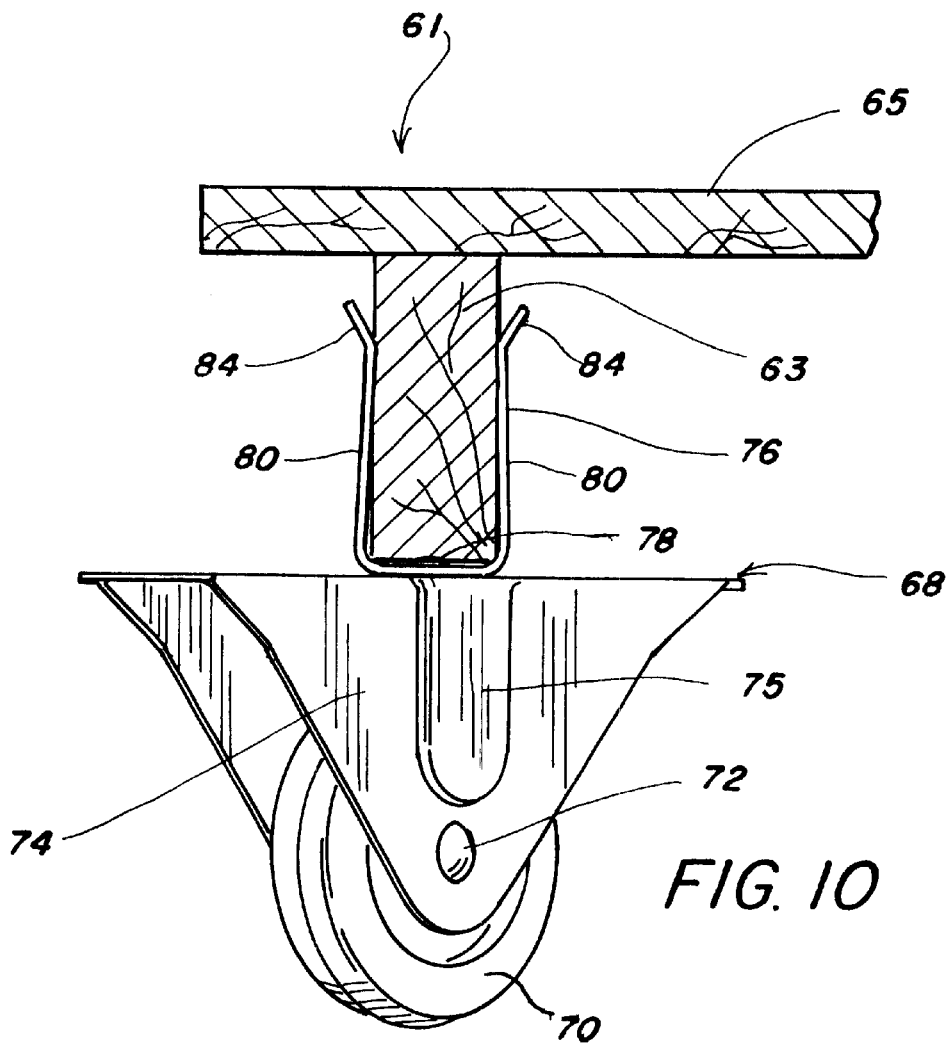

Referring to FIGS. 2 through 4, 8 and 10, further embodiments of the invention are shown which may be used with single deck pallets and also with double deck pallets, for example if installed in gaps 29 of a double deck pallet as shown in FIG. 1. As shown in FIG. 2, a single deck pallet 60 has runners or stringer boards 62 with slats or deck boards 64. Wheel assemblies 68 having wheels 70 are mounted to stringer boards 62. Wheel assembly 68 may have a conventional wheel 70 and axle 72 as previously described for the embodiment of FIG. 1. Further, wheel 70 may be mounted in a U-shaped mount or bight 74, which may have a strengthening bulge 75, as previously described for mount 34. Mount 74 is attached to a mounting bracket 76, as shown in FIG. 10, or 77 as shown in FIG. 8. Mount 74 could be a fixed wheel mount as previously described for the embodiments of FIG. 1 through 6. However, the embodiments shown in FIGS. 8, 9 and 10 have further features.

In FIGS. 9 and 10, U-shaped mount 74 is attached to mounting bracket 76 by a swivel pin 78. Swivel pin 78 permits relative rotating movement between U-shaped mount 74 and mounting bracket 76. This feature may also be included in the embodiment shown in FIGS. 1 and 2. Further, mounting bracket 76, or attaching bracket 36 of FIG. 1, could be fitted with a socket to receive the post of a caster type roller, not shown, which would also permit relative rotating movement.

Figure 3:
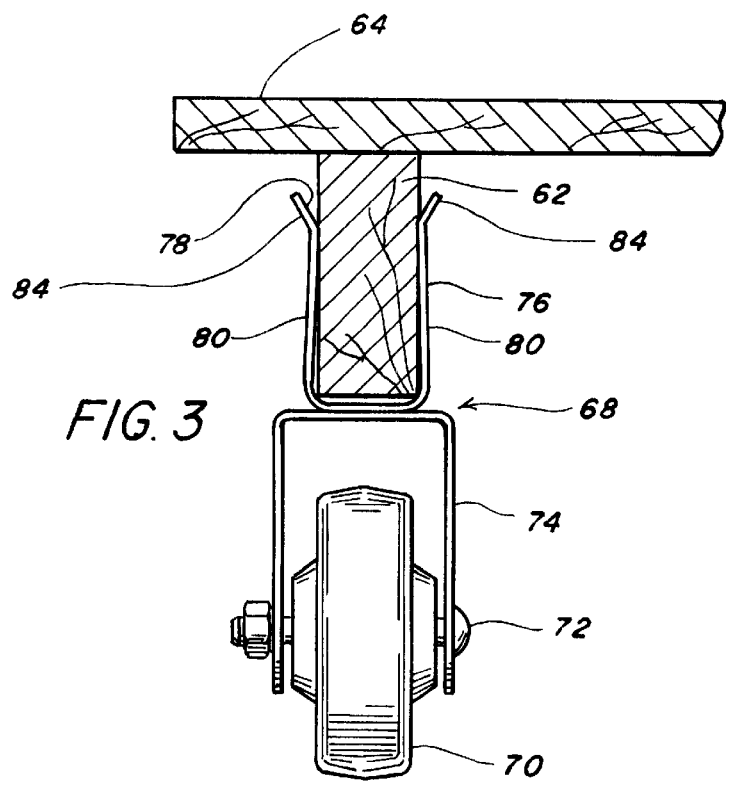
FIG. 3 is a partial cross-sectional view of the single deck pallet and wheel assembly as shown in FIG. 2.
Figure 4:
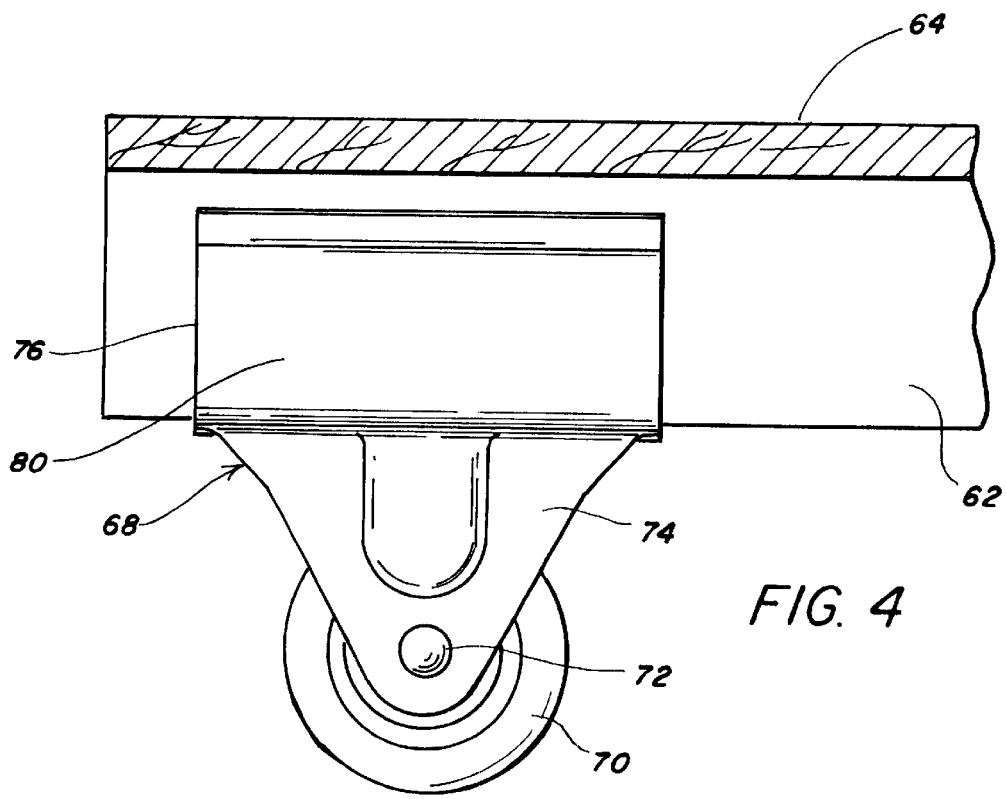
FIG. 4 is a side view of the single deck pallet and wheel assembly shown in FIG. 3, in partial cross-section.

Mounting bracket 76, shown in FIG. 10, has walls 80 which are biased toward each other to receive and confine a stringer board 63 of a single deck pallet 61. A similar structure is shown in FIG. 3. The upper portion of walls 80 may have guides 84, as shown, to guide a stringer board 63 into mounting bracket 76. Walls 80 of mounting bracket 76 may also have retaining barbs, not shown, such as retaining barbs 46 previously described. When mounting bracket 76 is attached to a runner on a refrigeration case or the like, guides 84 may be elongated laterally for support (not shown).

Wheel assemblies 28, and also 68, may be modified to have pivoting or relative rotating movement between the mounting bracket and the wheel mount to permit pallets to be moved by hand with additional convenience. In addition, long pallets such as those shown in FIGS. 9 and 10 with reference number 61 may be conveniently moved by a forklift machine 100. For example, if deck boards 65 of pallet 61 are heavily loaded or the load is out of balance, forklift truck 100 may not be able to lift and move pallet 61. However, with wheel assemblies 68 forklift truck 100 can move pallet 61 without lifting it, by pushing pallet 61 like a wheelbarrow.

Referring to FIG. 8, a further modification is shown which permits the wheel assembly to be adjusted to stringer boards of a variety of widths. It is preferred that wheel assembly 69 have a snug fit to the stringer board on which it is installed. The snug fit is primarily accomplished by having the walls of the mounting bracket bear resiliently on the stringer board. Wheel assembly 69, with continued reference to FIG. 8, can be adjusted to fit a variety of stringer boards with walls 81 and 83 resiliently pressed against the stringer board.

As shown in FIG. 8, wheel mount 74 has upper surface 89. Upper surface 89 has a series of threaded holes 91 formed thereon. Wall 81 of mounting bracket 77 is not fixed to wheel mount 74 and has an inwardly turned lip 93 at its base.

Similarly, wall 83 is not fixed to wheel mount 74 and has an inwardly turned lip 95 at its base, as shown. Lip 93 has a plurality of slots 97 therein, as shown, which mate with threaded holes 91. Lip 95 also has a plurality of slots 99 which mate with threaded holes 91. Walls 81 and 83 can be assembled on upper surface 89 of wheel mount 74 and adjusted to accommodate stringer boards of varying widths by telescoping lips 93 and 95 over threaded holes 91 and fastening lips 93 and 95 to upper surface 89 by threaded fasteners 101, one of which is shown. The adjustment may be close enough to achieve a snug fit of wheel assembly 69 to a stringer board and for walls 81 and 83 to resiliently bear on the stringer board. The top of wall 81 may have guides 85 and the top of wall 83 has guide portion 85 to assist with the installation of the wheel assembly 69 onto a stringer board with the described snug fit.

The snug fit achieved by the invention, as disclosed for all of the embodiments, normally permits wheel assemblies 28, 68 and 69 to be installed on stringer boards, or deckboards, without the use of additional fasteners, such as nail or screws, though such fasteners may be used if desired. Installation of wheel assemblies 28, 68 and 69 normally requires only a hammer to force assemblies 28, 68 and 69 onto stringer boards, or deckboards, with walls 40–42, 80 and 81–83 in snug resilient contact with their associated stringer boards or deckboards.

In view of the above, it will be seen that the several objects of the invention are achieved and other advantageous results attained. It will be appreciated by those skilled in the art that the examples and embodiments given here are for purposes of example. Many variations and modifications may be made in the details of the disclosed structure without departing from the spirit of the invention. For example, the orientation of the retaining barbs may be changed as desired, the wheel used may be of the type having locks or not, or the direction of the adjusting lips may be changed. These and other modifications will be apparent to those skilled in the art. The invention is not to be restricted to the details given here by way of example, but is to be limited only by the scope of the appended claims and their equivalents.

What is claimed:

1. A wheel mechanism for a structure with runners used in transporting and storing material, the wheel mechanism including a wheel mount and a wheel mounted therein, the wheel mechanism also including an open ended and U-shaped attaching bracket, the attaching bracket receiving a portion of a structure when used therewith and attaching the wheel mechanism thereto, the wheel mount being joined to the attaching bracket and extending downwardly therefrom, the open ended and U-shaped attaching bracket having a bight joined by spaced walls and having at least one of the walls being of resilient material, said at least one resilient wall having a bend such that a free end portion is flared outwardly and at least one retaining barb formed at the bend and coplanar with the outwardly flared portion of said at least one resilient wall and said outwardly flared portion of said at least one resilient wall forming a guide portion to position a runner between said spaced walls, the spaced walls receiving a portion of a structure when used therewith and the walls providing a resilient attaching force holding the attaching bracket to the portion of the structure when used therewith.

2. The wheel mechanism of claim 1 for use with a pallet wherein the wheel mechanism is attachable to a deckboard of the pallet.

3. The wheel mechanism of claim 1 for use with a pallet wherein the resilient wall is substantially horizontal and is attachable to a deckboard of the pallet.

4. The wheel mechanism of claim 1 for use with a pallet wherein the resilient wall is substantially horizontal and is biased toward another wall of the wheel mechanism to resiliently retain a deckboard of the pallet when a deckboard is received between the spaced walls of the wheel mechanism.

5. The wheel mechanism of claim 1 for use with a pallet wherein the wheel mechanism is attachable to a stringer board of the pallet.

6. The wheel mechanism of claim 1 for use with a pallet wherein the spaced walls are substantially vertical and are attachable to a stringer board of the pallet.

7. The wheel mechanism of claim 6 wherein at least one of the spaced walls is adjustable.

8. The wheel mechanism of claim 7 wherein the wheel mechanism has two spaced walls and each of the walls is resilient.

9. The wheel mechanism of claim 8 wherein the spaced walls are biased toward each other.

10. The wheel mechanism of claim 9 wherein each of the resilient walls have a guide located thereon.

11. The wheel mechanism of claim 6 wherein the wheel mechanism has two spaced walls and the spaced walls are each adjustable.

12. The wheel mechanism of claim 1 for use with a pallet wherein the spaced walls are substantially vertical and the resilient wall is biased toward another wall of the spaced walls to resiliently retain a stringer board of the pallet when a stringer board is received between the spaced walls of the wheel mechanism.

\* \* \* \* \*